(No Model.) 4 Sheets—Sheet 2.
J. H. MILLER.
SPRING SETTING MACHINE.

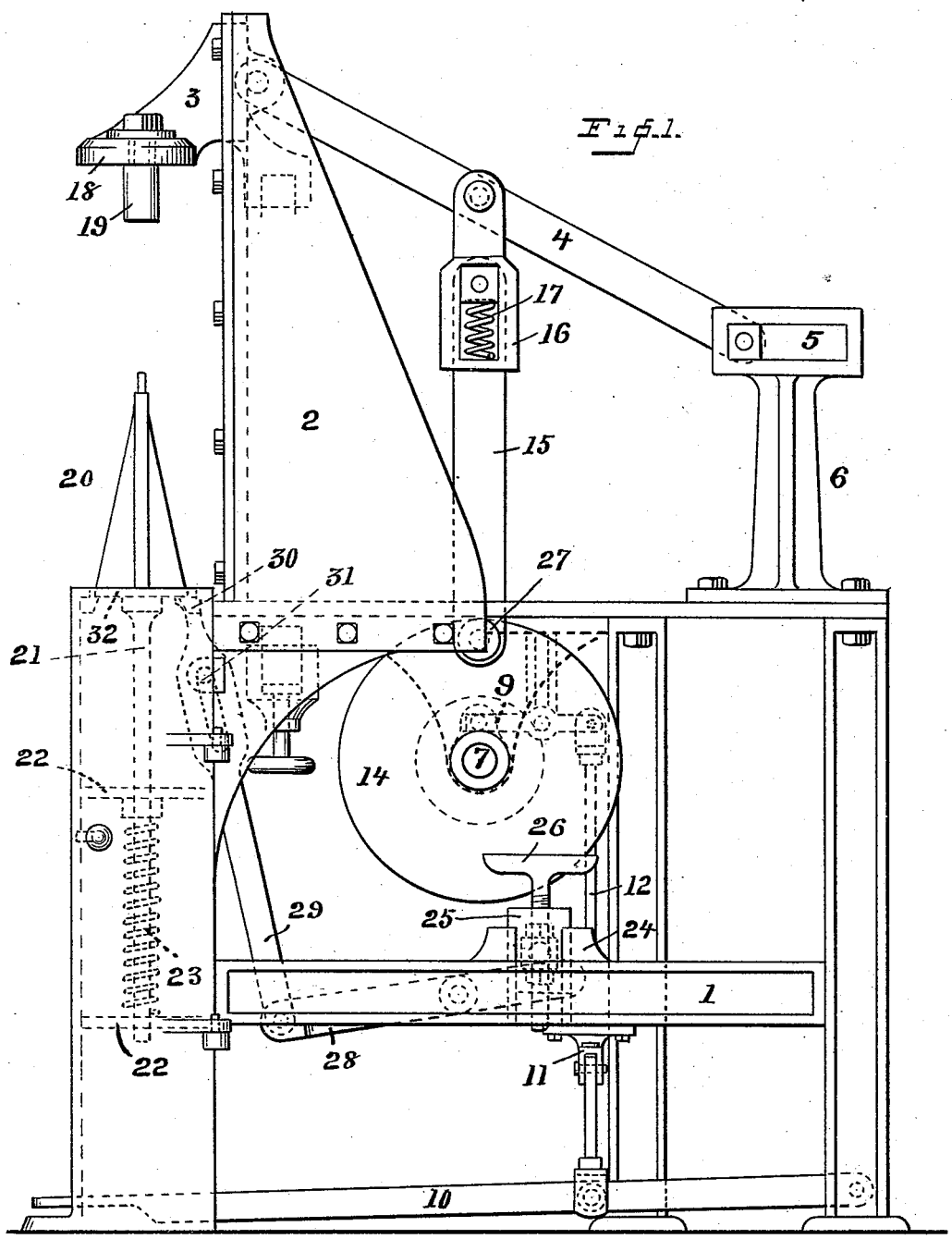

No. 486,832. Patented Nov. 22, 1892.

WITNESSES:
C. M. Newman
A. J. Tanner

INVENTOR:
John H. Miller
BY
S. H. Hubbard
ATTORNEYS.

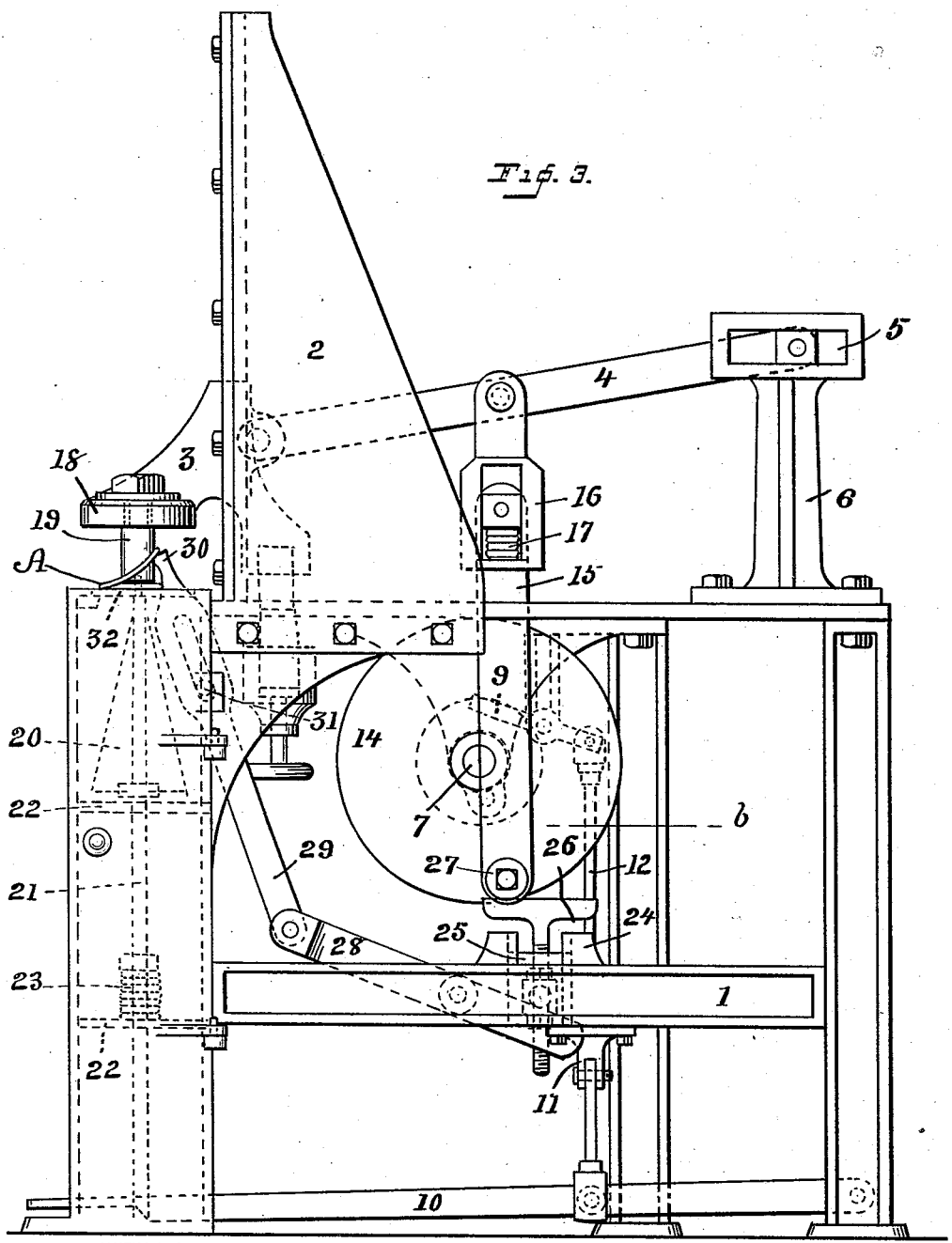

(No Model.)  4 Sheets—Sheet 4.
J. H. MILLER.
SPRING SETTING MACHINE.
No. 486,832. Patented Nov. 22, 1892.
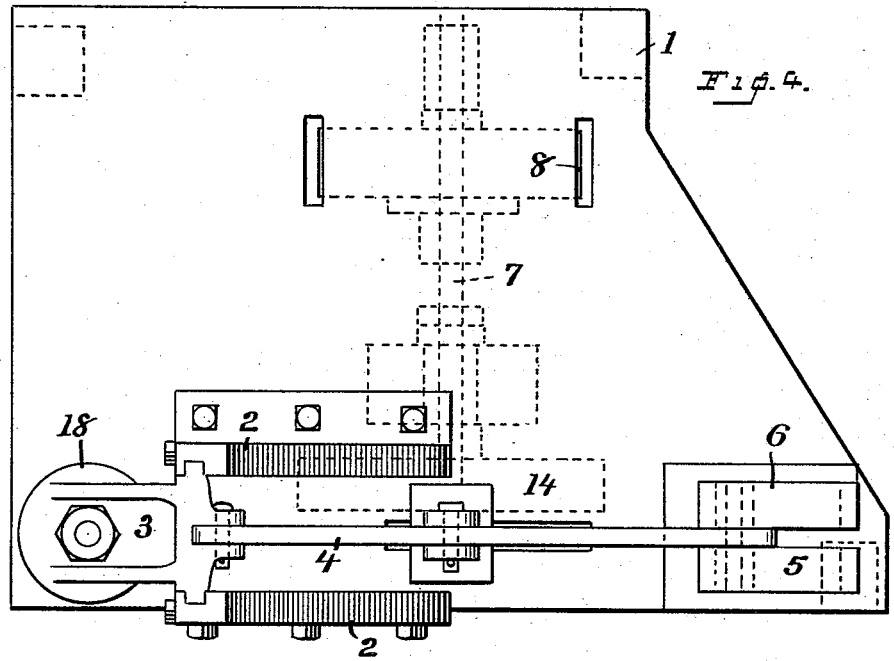
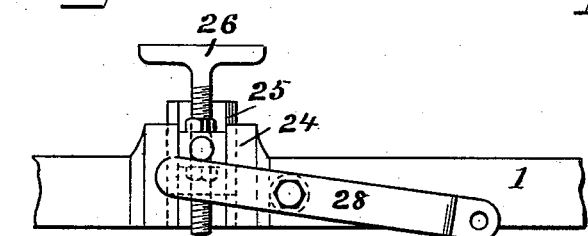
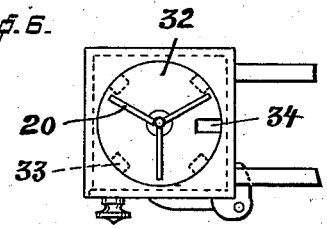
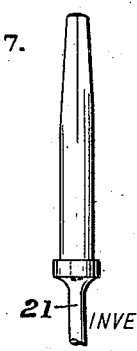
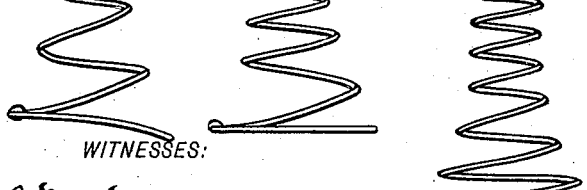
WITNESSES:
C. M. Newman
A. J. Tanner
INVENTOR:
John H. Miller
BY S. H. Hubbard
ATTORNEY

UNITED STATES PATENT OFFICE.

JOHN H. MILLER, OF BRIDGEPORT, CONNECTICUT.

SPRING-SETTING MACHINE.

SPECIFICATION forming part of Letters Patent No. 486,832, dated November 22, 1892.

Application filed May 20, 1892. Serial No. 433,708. (No model.)

*To all whom it may concern:*

Be it known that I, JOHN H. MILLER, a subject of the Emperor of Germany, residing at Bridgeport, in the county of Fairfield and State of Connecticut, have invented certain new and useful Improvements in Spring Crushing and Leveling Machines; and I do hereby declare the following to be a full, clear, and exact description of the invention, such as will enable others skilled in the art to which it appertains to make and use the same.

This invention relates to certain novel and useful improvements in machines for crushing and reducing to form wire springs, such as are used in spring-mattresses, furniture, car-seats, and the like; and the object of my invention is to provide a machine whereby the spring may be reduced in height, and whereby by means of suitable mechanism the lowermost coil of the spring may be bent or "leveled," as it is termed, so as to lie in a plane at right angles to the axis of the spring; and with these ends in view my invention consists and resides in the construction and combination of elements hereinafter fully explained, and then recited in the claims.

In order that such persons as are skilled in the art to which my invention appertains may fully understand its construction and operation, I will describe the same in detail, reference being had to the accompanying drawings, which form a part of this specification, and in which—

Figure 11:
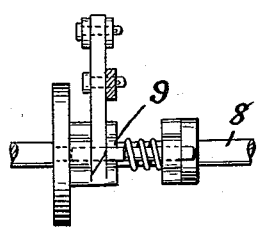
Figure 2:
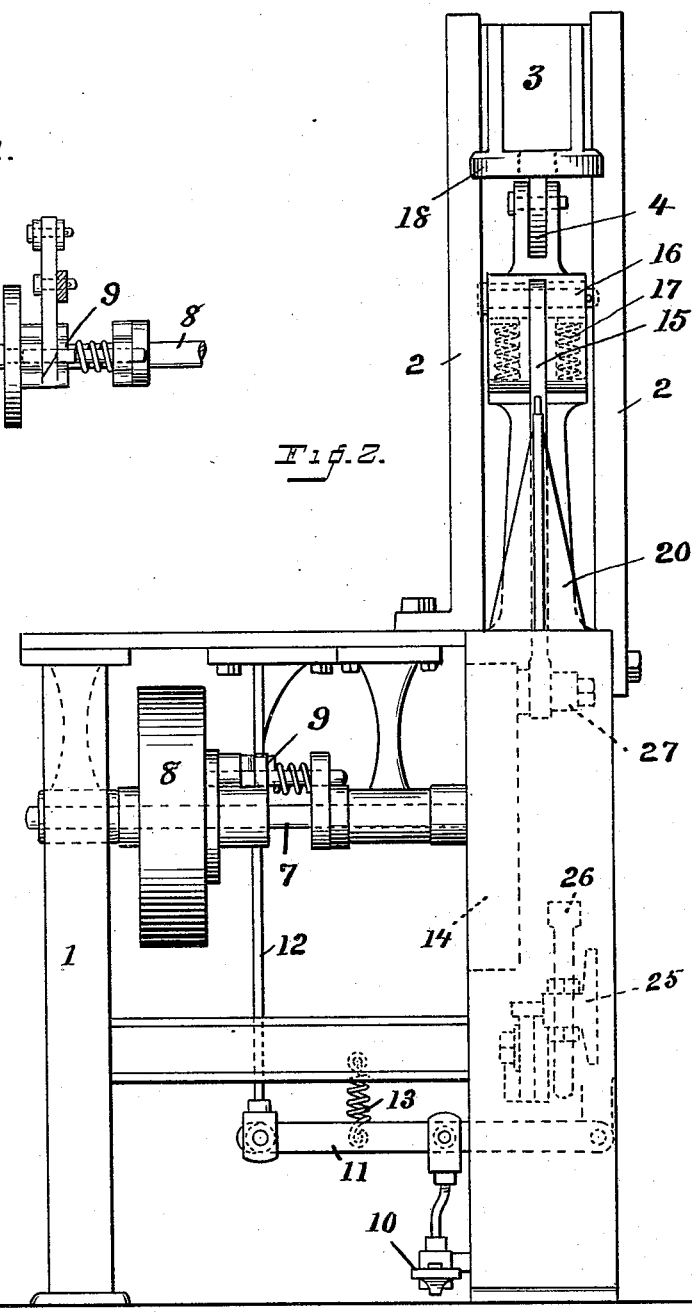

Figure 1 is a side elevation showing the machine at rest. Fig. 2 is a front elevation; Fig. 3, a view similar to Fig. 1, but showing the machine as completing its operation upon the spring. Fig. 4 is a plan view; Fig. 5, a detail inner side elevation of the mechanism for adjusting the throw of the bender. Fig. 6 is a detail plan view of the spring-support which appears in side elevation at Fig. 1 and front elevation at Fig. 2. Fig. 7 is a detail elevation of the sprindle or plunger used in connection with the form of spring shown at Fig. 10. Fig. 8 shows a single helical spring previous to the operation of the machine. Fig. 9 shows the same spring reduced to its completed shape. Fig. 10 shows a double helical spring. Fig. 11 is a detail of the starting-clutch.

The same numerals and letters denote the same parts in each of the figures.

By 1 I denote the frame of the machine, which may be of any convenient form, and 2 are standards mounted close together upon the top of the frame near one edge, as shown at Fig. 2. These standards are provided with vertical ways, in which is mounted and adapted to slide the crusher-head 3. Pivoted to this crusher-head is a lever 4, whose rear end is fulcrumed in such manner as to slide freely in a housing 5 in the top end of the short standard 6, which is mounted on top of the frame. Beneath the top or table on the frame there is journaled a shaft 7, which constitutes the main shaft of the machine, and upon this is mounted a band-wheel 8, which normally runs free, but which for the purpose of imparting rotary movement to said shaft may be connected thereto by means of any ordinary clutch, such as is indicated by 9 at Fig. 2, and the details of which are shown at Fig. 11. As this clutch is of the ordinary construction used in power-presses and similar machinery, I have not deemed it necessary to further describe it in detail.

The clutch just referred to is operated from a treadle 10 through any suitable devices, such as a lever 11 and the connecting-rod 12, the lever being provided with a spring 13 to return it to its normal position. Secured upon the shaft 7 is a large crank-disk 14, and to the face of this is pivoted a pitman 15, whose other end is connected to the lever 4 at about the center of the latter. This pitman 15 is made in two parts, which are joined, as shown, by means of a housing 16, within which are arranged one or more springs 17, whose purpose it is to give to said pitman a slight capacity for elongation under working strain, as hereinafter explained. The head 3 bears upon its outer end a circular block 18, from which depends a hub 19, having a small socket in its lower end. Immediately beneath this is a spring-supporting cone 20, preferably formed of three or more triangular plates, which are shown at Fig. 6 in plan view and at Fig. 1 in elevation, and which are affixed to a plunger 21, whose upper end is adapted to enter the socket in the hub 19. Said plunger is held in bearings 22, wherein it has capacity for downward movement against the action of a spring 23, which normally holds it in the position shown at Fig. 1.

The foregoing parts constitute the crushing apparatus of my machine.

I will now describe the devices whereby the lowermost coil of the spring is bent or leveled from the position in which it is shown at Fig. 8 to a plane at right angles to the axis of the spring, as shown at Fig. 9. On one of the cross-bars of the frame are arranged a pair of short vertical ways 24, in which a head 25 is mounted, as appears at Figs. 1 and 2. This head carries a T-shaped tappet 26 screw-threaded therein for purposes of adjustment. This tappet lies in the path of rotation of a hub or roller 27, which preferably constitutes one pivotal point of the pitman 15. As this hub is carried around by the disk it engages and depresses the tappet and the head to which it is attached, as is shown at Fig. 3. Through this head the motion of the tappet is communicated to a lever 28, fulcrumed to the frame, as shown at Fig. 1, and having its outer end pivotally secured to the lower extremity of a bender or leveling tool 29, whose upper end, as shown at 30, is designed to engage with and raise the wire forming the lowermost spring-coil, as seen at Fig. 3. A little above its center this bender is fulcrumed and guided by means of a slot cut therein and having a bearing upon a cross-pin or stud 31.

In the operation of my invention a spring—such as shown at Fig. 8—is first placed upon the cone 20, so that its lowermost coil rests upon the small lid or cover 32, which forms a bed or support therefor and is upheld upon the lugs or brackets 33. (Shown at Fig. 6.) This cover or bed is provided with radial slots beneath, through which the plates forming the cone may descend, and with an opening 34 at one side, through which the bender 29 may ascend to perform its function. When the spring is in position, the machine is started by means of the foot-treadle 10, and the disk 14 is thereby caused to revolve and through the pitman 15 to carry the head 3 downward. The socket in the lower end of the hub 19 fits over the reduced upper extremity of the plunger and for the remainder of its downward movement carries the latter with it until said cone is in the position shown in dotted lines at Fig. 3 and all the coils of the spring have been depressed and crushed downward by the end of the hub until they all lie in the same horizontal plane, as is shown at A in Fig. 3. This movement is completed at about the time that the hub 27 has reached the plane indicated by the line b in Fig. 3, and as the disk continues to rotate (the hub 19 having reached its limit of downward movement) the springs 17 within the housing permit the pitman to lengthen, thereby holding down the crushed spring with a yielding pressure. When the hub 27 engages the tappet 26, as heretofore stated, the latter is depressed by the wiping movement of said hub, and thereby the bender 29 is projected upward in the direction of its length. Its working face 30 engages the lowermost coil of wire and bends it upward, as appears at Fig. 3, and holds it there until the tappet is released by the hub, when the bender immediately recedes and the lowermost coil returns by its spring action into contact with the bed or cover. The object of this operation, as before stated, is to cause the lowermost coil to stand at right angles to the axis of the spring. With some qualities of wire it will have to be carried farther upward than with other qualities in order to give it the required set, and it is for this reason that the throw of the bender is made variable by the screw adjustment of the tappet. After the hub 27 has passed the center the head 3 is raised gradually to its starting position by the pitman, the spring A rises by reason of its resilience, and the plunger also rises inside said spring, so that its cone again supports the latter, as in the first instance. The form of cone shown is not essential, but is convenient for use in springs of a single helix. For a double helical spring I may use a plunger of the shape shown at Fig. 7.

In this my invention I do not wish to be confined to the exact details of construction which I have herein shown and described, since these may be freely altered and widely varied without departing from the spirit and aim of my invention, as set forth in the clauses of claim here following.

I claim—

1. The combination, with the crusher-head, whereby the spring is crushed and held, of a vertically-movable bender operating from beneath the bed and adapted to engage and lift the lowermost coil of the spring, substantially as shown and described.

2. In a machine of the character described, the combination, with the vertically-movable crusher-head whereby the spring is crushed flat and so held, of a bending-tool having its operating-face in substantially the same plane as the outermost coil of the spring, and means for projecting said bending-tool upward to perform its function prior to the release of the spring by the crusher-head.

3. The combination, in a machine as described, of a vertically-movable crusher-head, a pitman having an expansion-joint therein and adapted to operate said head, and a crank connected to and adapted to operate the pitman, substantially as set forth.

4. In a machine of the character described, the combination, with a support for the spring to be worked, of a vertically-movable and guided crusher-head, a lever whereby said head is operated in both directions, a pitman connected to the lever and provided with a spring-section, whereby it may elongate under strain, and a crank-disk connected to and adapted to actuate the pitman, substantially as specified.

5. In a machine as described, the combination, with the crusher-head having vertical movement for the depression of the spring, of the pitman having a yielding section to permit of its elongation under strain, the crank-disk connected with and adapted to actuate the pitman, and the vertically-movable bender and connections between it and the crank-disk, whereby said bender is actuated by the crank-disk after the downward movement of the crusher-head.

6. In a machine of the character described, the combination, with the vertically-movable crusher-head, of a support beneath said crusher-head for the spring to rest upon, the vertically-disposed plunger depressilbe through the bed, and a vertically-movable bending device operating from below the bed and adapted to engage and lift the lowermost coil of the spring, substantially as shown and described.

In testimony whereof I affix my signature in presence of two witnesses.

JOHN H. MILLER.

Witnesses:
SHERMAN H. HUBBARD,
M. C. HINCHCLIFFE.